(12) United States Patent
Ai (10) Patent No.: US 6,238,095 B1
(45) Date of Patent: *May 29, 2001

(54) RELIEVED TAPERED ROLLER BEARING WITH TRUE ROLLING CONTACTS

(75) Inventor: Xiaolan Ai, Massillon, OH (US)

(73) Assignee: The Timken Company, Canton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,749

(22) Filed: Jan. 6, 1999

(51) Int. Cl.$^7$ ....................................................... F16C 33/58
(52) U.S. Cl. ............................ 384/450; 384/551; 384/571
(58) Field of Search .................................... 384/450, 371, 384/565, 551, 653, 618, 619

(56) References Cited

U.S. PATENT DOCUMENTS

| | | |
|---|---|---|
| Re. 18,562 | 7/1932 | Bronander . |
| 725,620 * | 4/1903 | Henderson ............................ 384/553 |
| 931,924 | 8/1909 | Hess . |
| 954,529 | 4/1910 | Lockwood . |
| 958,143 | 5/1910 | Lockwood . |
| 977,458 | 12/1910 | Lockwood . |
| 1,003,055 | 9/1911 | Lockwood . |
| 1,226,345 | 5/1917 | Lockwood . |
| 1,552,031 | 9/1925 | Birgh . |
| 1,697,493 | 1/1929 | Bronander . |
| 1,795,471 | 3/1931 | Buckwalter . |
| 1,885,852 | 11/1932 | Medved . |
| 1,982,899 | 12/1934 | Buckwalter . |
| 2,089,048 | 8/1937 | Bachman . |
| 2,221,514 | 11/1940 | Foley . |
| 3,698,777 | 10/1972 | McCoy . |
| 4,629,340 * | 12/1986 | Provost et al. .................... 384/450 X |
| 5,284,395 * | 2/1994 | Stemberger ........................... 384/565 |
| 5,975,762 * | 11/1999 | Ai ........................................ 384/450 |

FOREIGN PATENT DOCUMENTS

| | | |
|---|---|---|
| 631061A1 | 12/1994 | (EP) . |
| 946601 | 12/1948 | (FR) . |

* cited by examiner

Primary Examiner—David A. Bucci
Assistant Examiner—Colby Hansen
(74) Attorney, Agent, or Firm—Folster, Lieder, Wooodruff & Lucchesi, L.C.

(57) ABSTRACT

A tapered roller bearing has inner and outer races and tapered rollers organized in at least two rows, with the rollers of the one row being generally aligned with the rollers in the other row. The large ends of the rollers are presented toward each other so that the forces which urge the rollers of either row up their tapered raceways are resisted by the rollers of the other row. The end faces of the aligned rollers in the two rows contact each other or else contact rollers of an intervening row. The geometry of the rollers and the raceways along which they roll are such that, when one race rotates relative to the other race, pure rolling contact exists between the side faces of the rollers and the raceways and pure rolling contact also exists at the end faces of the rollers. Moreover, the lines of contact for the aligned rollers of any set are synchronized and the rollers are stable. The rollers of one of the rows are relieved, and this, depending on the configuration of the relieved roller, promotes stability, enables the rollers to transfer radial loads, or renders the bearing highly compact, and it also facilitates the circulation of a lubricant in the bearing

21 Claims, 4 Drawing Sheets

RELIEVED TAPERED ROLLER BEARING WITH TRUE ROLLING CONTACTS

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention relates in general to tapered roller bearings, and more particularly to multirow tapered roller bearings in which true rolling contact exists at all critical surfaces during operation of the bearing and in which reliefs exist in the bearing for improving its operation.

Antifriction bearings come in several basic configurations, but irrespective of its configuration, an antifriction bearing includes a pair of ring-like races and rolling elements arranged in at least one row between the races. The rolling elements contact raceways on the races, and when the bearing is set in operation, the rolling elements roll along those raceways and around the axis of the bearing.

When the rolling elements take the form of cylindrical rollers, the bearing has the capacity to take heavy radial loads, but is not very satisfactory for transmitting thrust loads. Moreover, cylindrical roller bearings usually have radial clearances, and thus are not suitable in applications requiring stability, rigidity and a good measure of precision. A ball bearing, in which the rolling elements are balls, may have its raceways oriented obliquely to the axis of the bearing so that the bearing takes radial and thrust loads. When arranged in pairs, these angular ball bearings may be adjusted against each other to eliminate end play—and radial clearances as well—but the load capacity of an angular ball bearing is relatively low. A tapered roller bearing possesses the advantages of both cylindrical roller bearings and angular ball bearings. It has the capacity to carry heavy radial loads and also thrust loads, all through its tapered rollers and the raceways along which they roll. Moreover, a tapered roller bearing may be adjusted to eliminate clearances between its rollers and raceways.

Owing to the geometry of a tapered roller bearing, the tapered rollers tend to move up the raceways and unless restrained will be expelled from the bearing. For this reason, the conventional tapered roller bearing has a thrust rib at the large end of one of its raceways, usually on the inner race which is called the cone. As the rollers roll along the raceways, the large end faces of the rollers bear against the thrust rib, and the rollers remain in place axially. While generally pure rolling contact exists between the tapered side faces of the rollers and the raceways, the end faces of the rollers slide and spin along the face of the thrust rib. In the absence of adequate lubrication, the bearing may fail at this critical area, for here the friction is highest within the bearing. This represents a significant concern, particularly for bearings that operate at high speeds. Moreover, due to the slide and spin motion between the roller ends and the thrust rib, the torque within a tapered roller bearing operating at low speed, is relatively high and, to a measure, wear as well.

BRIEF SUMMARY OF THE INVENTION

The present invention resides in tapered roller bearings that have true rolling contact along all critical load-bearing surfaces and further have reliefs in their rollers or raceways. To this end, each bearing has rollers arranged in multiple rows with the rollers of any row backing the rollers of the adjacent row. Indeed, the end faces of the rollers of adjacent rows contact each other and in these regions of contact pure rolling contact exists. In the absence of their normal supply of lubrication, the bearings will remain operational for sustained periods of time. The reliefs, when in the tapered rollers of at least one row, enable the end faces of the rollers to assume a configuration which facilitates stability, in that it enables contacting rollers to better track each other. When the reliefs are in intervening rollers of a cylindrical configuration, they enable those rollers to carry radial loads, whereas otherwise they may not. The reliefs also facilitate circulation of lubricants. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur.

DETAILED DESCRIPTION OF THE INVENTION

The bearings of this invention all include tapered rollers arranged in two rows between tapered raceways and may include additional rollers between the two rows of tapered rollers. The tapered rollers of the one row back the tapered rollers of the other row and vice versa, so that the tapered rollers remain in place between their respective raceways, defying the natural tendency to move up the raceways. Where the bearing contains only two rows of tapered rollers and no intervening rollers, one row directly backs the other row, that is the rollers of the two rows contact each other at their large end faces. However, where the bearing contains intervening rollers, the backing is indirect; that is to say, the backing or resisting force applied to the tapered rollers of the two rows is transferred through the rollers of the intervening row.

In order for the tapered rollers to effectively back each other, the rollers in the two rows must be equal in number and furthermore must be aligned. The same holds true for the intervening rollers; they are equal in number to the tapered rollers in each of the two rows and are aligned with those rollers. Thus, within the bearing the rollers are organized into sets, with each set including a tapered roller of one row, the corresponding aligned tapered roller of the other row, and any intervening roller that is located between the aligned tapered rollers.

The side faces of the tapered rollers contact the tapered raceways between which the rollers revolve, and here pure rolling contact exists. This derives from the on-apex design of the raceways. In an on-apex design, the envelopes formed by the raceways for a row of tapered rollers will meet at a common point along the axis of the bearing. Also, where the roller of one row contacts the corresponding roller of the other row or where corresponding rollers of the two rows contact an intervening roller that lies between them, pure rolling contact exists. Where intervening rollers exist in a bearing, so do intervening raceways to guide and position those rollers, and pure rolling contact likewise exists between the intervening rollers and their raceways as well. Thus, at all points or lines of contact between the tapered rollers, the intervening rollers, and the raceways, pure rolling contact exists and with it the absence of any significant friction and minimal torque. Furthermore, the rollers of a set are configured to track each other. As a consequence, the tapered rollers of the two rows and the intervening rollers, if any, remain synchronized.

The rollers of at least one of the rows are relieved to provide on each roller of that row two different peripheral or side surfaces. One side surface contacts the outer raceway for the row and the other side surface contacts the inner raceway for the row. By relieving the side faces of the tapered rollers in at least one row, one can configure the end faces of those rollers and the contacting end faces for the rollers of the adjacent row to improve contact stability. Also, it enables the rollers of the two rows to better track each other, and this facilitates synchronization of the two rows. By relieving the side faces of generally cylindrical rollers in an intervening row, the intervening rollers can operate between two raceways and thus transfer radial loads, whereas otherwise they might not, yet the bearing remains compact. The reliefs further facilitate the flow of a lubricant in the bearing.

Figure 1:
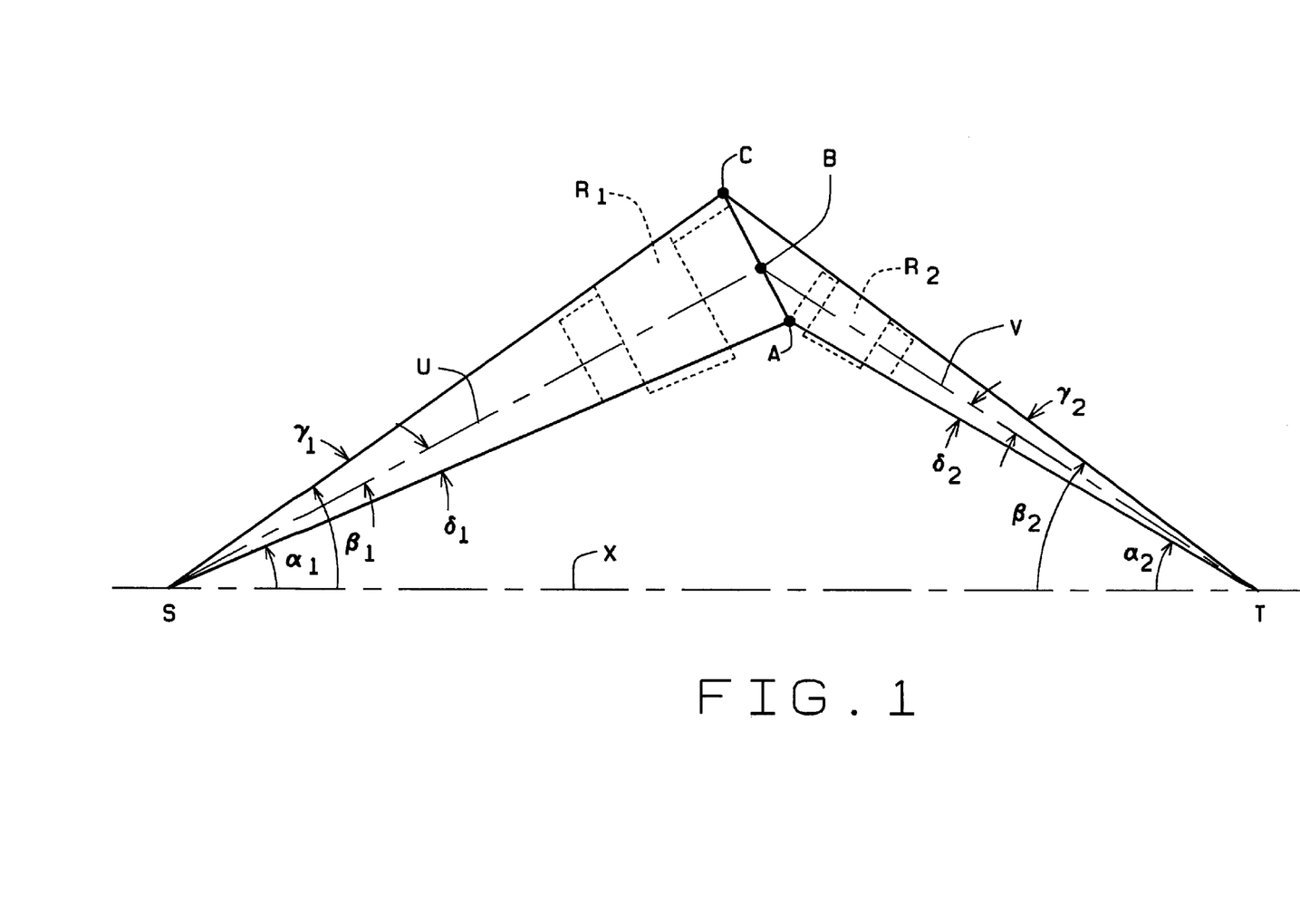
FIG. 1 is schematic view illustrating the fundamental design geometry in bearings of the present invention.

The fundamental design concept for a bearing having pure rolling contact where tapered rollers, raceways and intervening rollers, if any, are in contact and the rollers of at least one of the rows are relieved may be illustrated schematically (FIG. 1). The bearing has an axis X and tapered rollers $R_1$ and $R_2$ arranged in two rows around the axis X, with the large ends of the rollers $R_1$ and $R_2$ generally presented toward each other. Each roller $R_1$ lies between and rolls along tapered raceways, revolving about its own axis U as it does. The axis U of the roller $R_1$ intersects the bearing axis X at point S. The conical envelopes for the raceways lie at angles $\alpha_1$ and $\beta_1$ with respect to the axis X and intersect the axis X at the same point S. Hence, the roller $R_1$ is on apex. On the other hand, the conical envelopes for the raceways lie at angles $\gamma_1$ and $\delta_1$ with respect to the axis U. Likewise, each roller $R_2$ lies between and rolls along tapered raceways and revolves about its own axis V as it does. The axis V intersects the bearing axis X at point T which is offset from point S. The envelopes for the two raceways for the roller $R_2$ lie at angles $\alpha_2$ and $\beta_2$ with respect to the axis X and intersect the axis X at point T. Thus, the rollers $R_2$ are likewise on apex. Moreover, the raceways lie at angles $\gamma_2$ and $\delta_2$ with respect to the axis V. The envelopes for the two inner raceways, that is the ones that lie at the angles $\alpha_1$ and $\alpha_2$, intersect at point A. The envelopes for the two outer raceways, which lie at the angles $\beta_1$ and $\beta_2$, intersect at point C. Actually, in the bearing itself, the envelopes of the raceways intersect at circles, but when the bearing is considered schematically in a plane, the circles of intersection become points of intersection. The axes U and V for the two rollers $R_1$ and $R_2$ intersect at point B. Points A, C and B lie in a straight line. The following angular relationship exists in the bearing:

$$\frac{\sin\alpha_1}{\sin\beta_1} \cdot \frac{\sin\gamma_1}{\sin\delta_1} = \frac{\sin\alpha_2}{\sin\beta_2} \cdot \frac{\sin\gamma_2}{\sin\delta_2}$$

When the tapered rollers $R_1$ and $R_2$ have no reliefs, the angle $\gamma_1$ equals the angle $\delta_1$ and likewise the angle $\gamma_2$ equals the angle $\delta_2$. Hence, in that form, the basic formula reduces to:

$$\frac{\sin\alpha_1}{\sin\beta_1} = \frac{\sin\alpha_2}{\sin\beta_2}$$

The tapered rollers $R_1$ and $R_2$, in the absence of intervening rollers, should abut along the line ABC, and when they do, line ABC represents a line of pure rolling contact between the rollers $R_1$ and $R_2$. This line ABC, during the operation of the bearing, remains synchronized with the lines SA and SC representing pure rolling contact between the roller $R_1$ and the raceways along which it rolls, and likewise remains synchronized with the lines TA and TC representing pure rolling contact between the roller $R_2$ and the raceways along, which it rolls.

More specifically, a bearing I (FIGS. 2 and 4) includes an inner race in the form of a cone 2, an outer race in the form of a double cup 4, primary tapered rollers 6 arranged in one row between the cone 2 and cup 4, and secondary tapered rollers 8 arranged in another row between the cone 2 and cup 4. The bearing I has an axis X of rotation about which the cone 2 rotates within the cup 4 or the cup 4 revolves around the cone 2.

Figure 4:
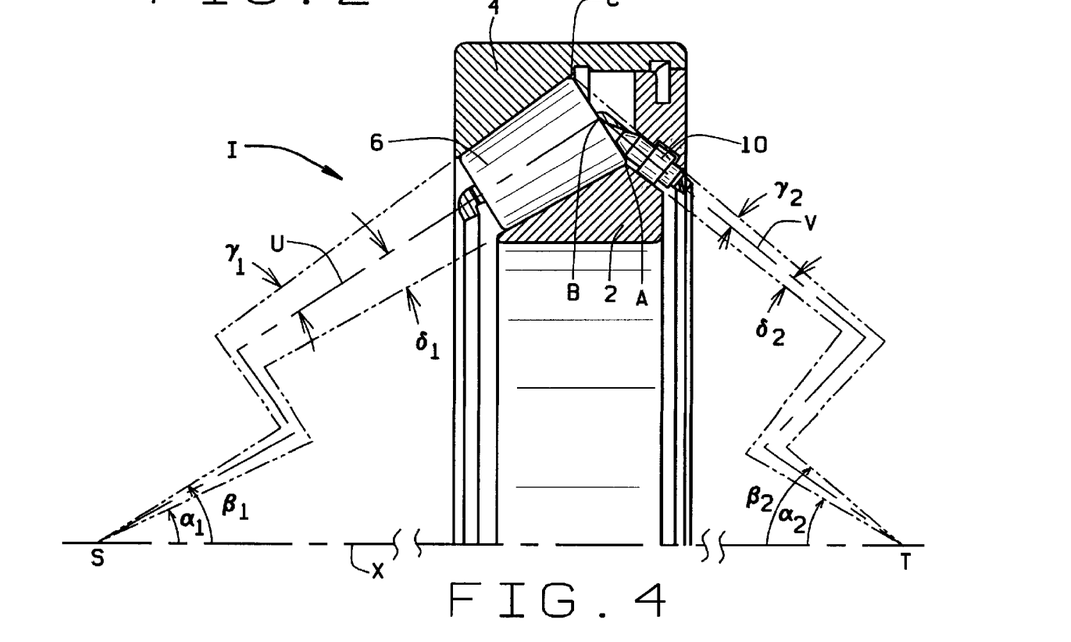
FIG. 4 is a sectional view similar to FIG. 2, but showing the envelopes in which the rollers and raceways exist and other reference lines and points, as well as significant angles.

The cone 2 is unitary, it having two raceways 10 and 12 which are presented outwardly away from the axis X. The raceways 10 and 12 extend away from each other and have their greatest diameters intermediate the ends of the cone 2 and their least diameters at the ends of the cone 2. The raceway 10 lies within a conical envelope that has its apex along the axis X at point S (FIG. 4). The envelope forms an angle $\alpha_1$ with respect to the axis X. The raceway 12 lies within a conical envelope that has its apex at point T along the axis X. The envelope forms an angle $\alpha_2$ with respect to the axis X. The envelopes for the inner raceways 10 and 12 intersect at a point A.

The double cup 4 has two rings 14 and 16, which are clamped or otherwise held securely together. The ring 16 fits into a bore 18 located in the ring 14 and is retained in that bore by several spring-loaded pins 20. The ring 14 has a tapered raceway 22 which is presented inwardly toward the raceway 10 on the cone 2. It lies within a conical envelope that also has its apex at point S along the axis X and lies at an angle $\beta_1$ with respect to the axis X (FIG. 4). The smaller ring 16 fits snugly into the bore 18 in the large ring 14 and is secured firmly in the ring 14 by the spring-loaded pins 20. The ring 16 has a tapered raceway 24 which is presented inwardly toward the raceway 12 of the cone 2. The envelope formed by the raceway 24 has its apex at the point T along the axis X, and that envelope lies at an angle $\beta_2$ with respect to the axis X. It intersects the envelope for the raceway 22 at a point C. While the raceways 10, 12 and 22 are continuous between their ends, the smaller ring 16 contains a groove 26 which opens out of its raceway 24, thus dividing that raceway 24 into large and small diameter segments.

Figure 2:
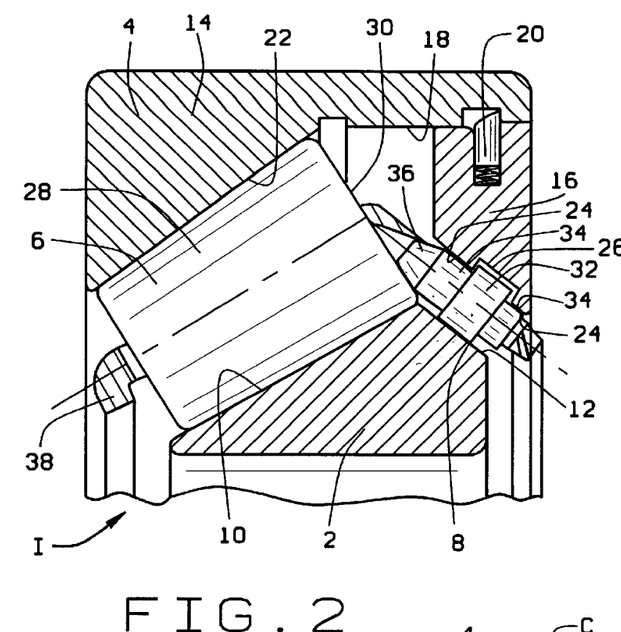
FIG. 2 is a sectional view of a double row tapered roller bearing in which pure rolling contact exists at all critical surfaces.

The rollers 6 lie in a row between the raceways 10 and 22 of the cone 2 and cup 4, respectively. Each roller 6 has a tapered peripheral or side face 28 and a large end face 30. The side face 28 contacts the raceways 10 and 22, there being essentially line contact here. During relative rotation between cone 2 and cup 4, the rollers 6 roll along the raceways 10 and 22, each revolving about its axis U. The axis U intersects the bearing axis X at point S and intersects a straight line connecting points A and C at point B. The raceway 22 of the cup 4 lies at an angle $\gamma_1$ with respect to the axis U, and the raceway 10 of the cone 2 lies at an angle $\delta_1$ with respect to the axis U. The angles $\gamma_1$ and $\delta_1$ are equal.

The primary and secondary rollers 6 and 8 are organized into sets. Each set includes a single primary roller 6 and a single secondary roller 8 that is aligned with the primary roller 6. Indeed, the primary and secondary rollers 6 and 8 of a set track each other.

Figure 3:
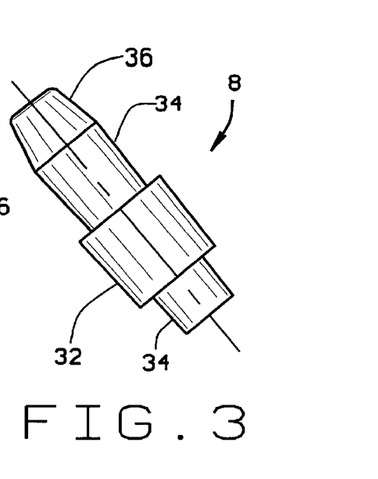
FIG. 3 is an elevational view of the relieved secondary roller for the bearing of FIG. 2.

Each secondary roller 8 has a large side surface 32 and a small side surface 34, both of which taper in the same direction (FIG. 3). Actually, the small side surface 34 exists in two segments, with the large side surface 32 being between those segments. The large side surface 32 contacts and conforms to the raceway 12 on the cone 2 where essentially line contact exists between the surface 32 and the raceway 12 (FIG. 2). The large side surface 32 also projects into the groove 26 in the small ring 16 of the cup 4, but does not contact the ring 16, nor do the shoulders at its ends contact the ring 16. The small side surface 34 contacts the raceway 24 on the small ring 16 of the cup 4 on both sides of the groove 26. Again, essentially line contact exists between the small side surface 34 and the raceway 24. When relative rotation occurs between the cone 2 and the cup 4, the secondary roller 8 at its large side surface 32 rolls along the cone raceway 12 and at its segmented small side surface rolls along cup raceway 24. Indeed, the secondary roller 8 revolves about an axis V which coincides with the centerline of the roller 8 and intersects the bearing axis X at point T and intersects the line AC at point B (FIG. 4). Thus, the axes U and V of the primary and secondary rollers 6 and 8, respectively, intersect at point B which is along the line AC. The raceway 24 of the cup 4 lies at an angle $\gamma_2$ with respect to the axis V, whereas the raceway 12 of the cone 2 lies at an angle $\delta_2$ with respect to the axis V. The angle $\delta_2$ exceeds the angle $\gamma_2$.

In addition, each secondary roller 8 has a beveled large end face 36 (FIGS. 2 and 3), along which it bears against the large end face 30 of the primary roller 6 with which the roller 8 aligns. Line contact exists between the beveled end face 36 of the secondary roller 8 and the large end face 30 of the primary roller 6, and that contact lies along the line AC in the region between the points A and B.

Finally, the bearing I includes a cage 38 (FIG. 2) which along with the rollers 6 and 8 fits into the space between the cone 2 and cup 4. The cage 38 contains pockets in which it receives the rollers 6 and 8. The cage 38 insures that the rollers 6 and 8 remain aligned and organized in sets.

In the operation of the bearing I, the cone 2 rotates relative to the cup 4 or vice versa, but in any event the rotation is about the axis X. The primary rollers 6 roll along the raceways 10 and 22 of the cone 2 and cup 4, respectively. Likewise the secondary rollers 8 roll along the raceways 12 and 24. Being tapered, the primary rollers 6 tend to move up their raceways 10 and 22, that is toward the large ends of the raceways 10 and 22. Likewise, the tapered secondary rollers 8 tend to move up the raceways 12 and 24 which they contact. But the rollers 6 and 8 remain properly positioned since they abut at their end faces 30 and 36. For each roller 6, a roller 8 is aligned with it and bears against it along the line ABC, thus preventing the rollers 6 from moving up the raceways 10 and 22. Similarly the roller 6 prevents the aligned roller 8 from moving up its raceways 12 and 24. The convergence of the raceways 10 and 22 prevents the rollers 6 from moving down those raceways 10 and 22 toward the one end of the bearing I, and likewise the convergence of the raceways 12 and 24 prevents the rollers 8 from moving down those raceways 12 and 24 toward the opposite end of the bearing I. Thus, the rollers 6 and 8 are captured between the cone 2 and cup 4 in the sense that they cannot be displaced radially or axially, but they can roll along their respective raceways 10, 22 and 12, 24. When they roll, essentially pure rolling contact exists between:

1. the side faces 28 of the rollers 6 and the raceways 10 and 22;
2. the large side faces 32 of the rollers 8 and the raceway 12;
3. the small side faces 34 of the rollers 8 and the raceway 24; and
4. the end faces 30 of the rollers 6 and the beveled end faces 36 of the rollers 8.

The following mathematical relationship exists in the bearing I:

$$\frac{\sin\alpha_1}{\sin\beta_1} \cdot \frac{\sin\gamma_1}{\sin\delta_1} = \frac{\sin\alpha_2}{\sin\beta_2} \cdot \frac{\sin\gamma_2}{\sin\delta_2} \text{ or } \frac{\sin\alpha_1}{\sin\beta_1} = \frac{\sin\alpha_2}{\sin\beta_2} \cdot \frac{\sin\gamma_2}{\sin\delta_2}$$

since $\sin\gamma_1$ equals $\sin\delta_1$

The bearing I operates under preload, and as a consequence, no axial or radial free motion exists. In other words, no clearances exist between the primary rollers 6 and their raceways 10 and 22, nor between the secondary rollers 8 and their raceways 12 and 24, nor between the end faces 30 and 36 of aligned rollers 6 and 8.

Because the raceway 24 of the cup 4 is relieved, each secondary roller 8 can have and does have two side faces 32 and 34, the former being greater in diameter than the latter. This enables the beveled end face 36 of the roller 8 to be configured such that the end face 30 of the corresponding primary roller 6 is flat. This in turn facilitates stability in that it enables the secondary roller 8 to better track its corresponding primary roller 6. After all, a beveled end face against a flat end face produces better tracking than two beveled end faces against each other.

A modified bearing II (FIG. 5) includes an inner race in the form of a cone 40 having two tapered raceways 42 and 44 and a cylindrical raceway 46 located between the large ends of the tapered raceways 42 and 44. Thus, the tapered raceways 42 and 44 taper downwardly away from the intervening cylindrical raceway 46. While the cylindrical raceway 46 lies between the two tapered raceways 42 and 44, it does not run out to their large ends. Instead, it is separated from the large ends of the tapered raceways 42 and 44 by grooves 48.

Figures 5, 6:
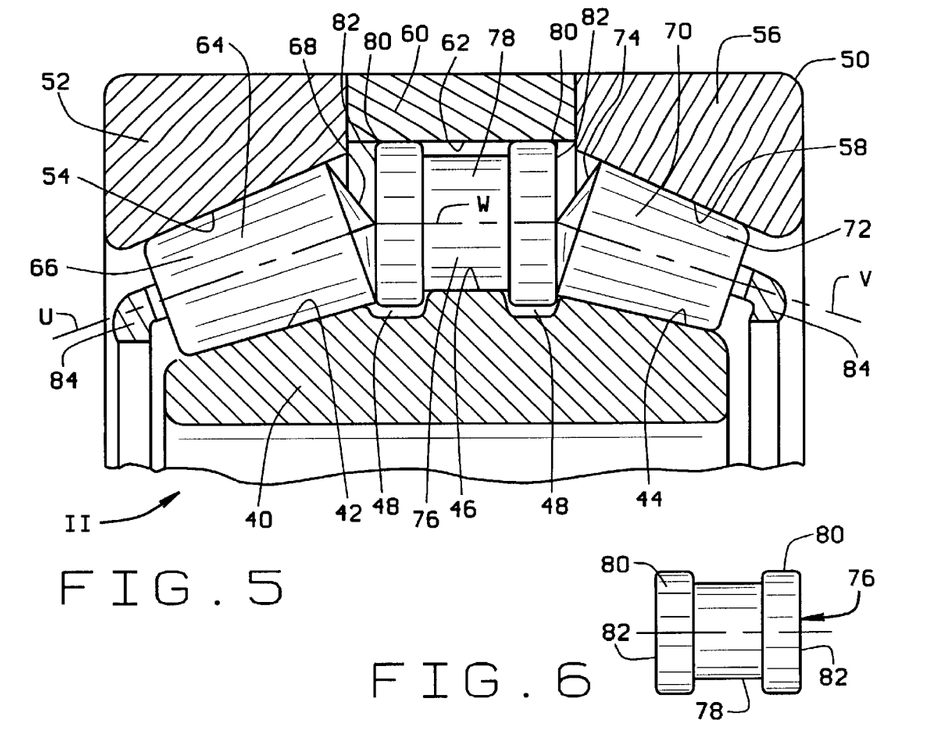
FIG. 5 is a sectional view of a modified bearing having tapered rollers in its end rows and cylindrical rollers in its intervening row, with pure rolling contact at all critical surfaces.
FIG. 6 is an elevational view of a relieved intervening roller for the bearing of FIG. 5.

In addition, the bearing II has an outer race in the form of a segmented cup 50 including a single cup 52 having a raceway 54 that is presented opposite the raceway 42 of the cone 40, another single cup 56 having a raceway 58 that is presented opposite the raceway 44 of the cone 40, and a spacer 60 having a cylindrical raceway 62 that is presented opposite the intervening raceway 46 of the cone 40. The two single cups 52 and 56 and the spacer 60 are all clamped firmly together or otherwise secured so that they will not separate.

The space between the two raceways 42 and 54 of the cone 40 and cup 50 is occupied by a row of tapered rollers 64. Each roller 64 has a side face 66 that is in essentially line contact with the two raceways 42 and 54 and at its large end has a conical end face 68 that is convex. The rollers 70 may differ in configuration from the rollers 64.

The space between the other tapered raceways 44 and 58 is occupied by another row of tapered rollers 70, with each roller 70 of that row having a side face 72 that is in line contact with the raceways 44 and 58. The side face 72 on each roller 70 leads up to a conical end face 74 that is convex. The rollers 70 may differ in configuration from the rollers 64.

The space between the cylindrical raceways 46 and 62 on the cone 40 and the cup 50 is occupied by a set of intervening rollers 76. Each roller 76 has a small diameter side surface 78 that contacts the intervening raceway 46 of the cone 40 and a segmented large diameter side surface 80 which contacts the cylindrical raceway 62 on the spacer 60. Line contact exists between the side surface 78 and the raceway 46 and between the side surface 80 and the raceway 62. The large side surfaces 80 extend out to planar end faces 82 against which the conical end faces 68 and 74 of the tapered rollers 64 and 70 bear, there being line contact between the conical end faces 68 and 74 and the planar end faces 82. In this regard, the rollers 64, 70 and 76 are organized into sets, so for every intervening roller 76, a single tapered roller 64 aligns with it at its one end face 82 and another tapered roller 70 aligns with it at its other end face 82.

The bearing II includes a cage 84 which extends through the annular space between the cone 40 and the cup 50, and it has pockets for receiving the rollers 64, 70 and 76. Indeed, a separate pocket exists for each set of aligned rollers 64, 70 and 76.

Figure 7:
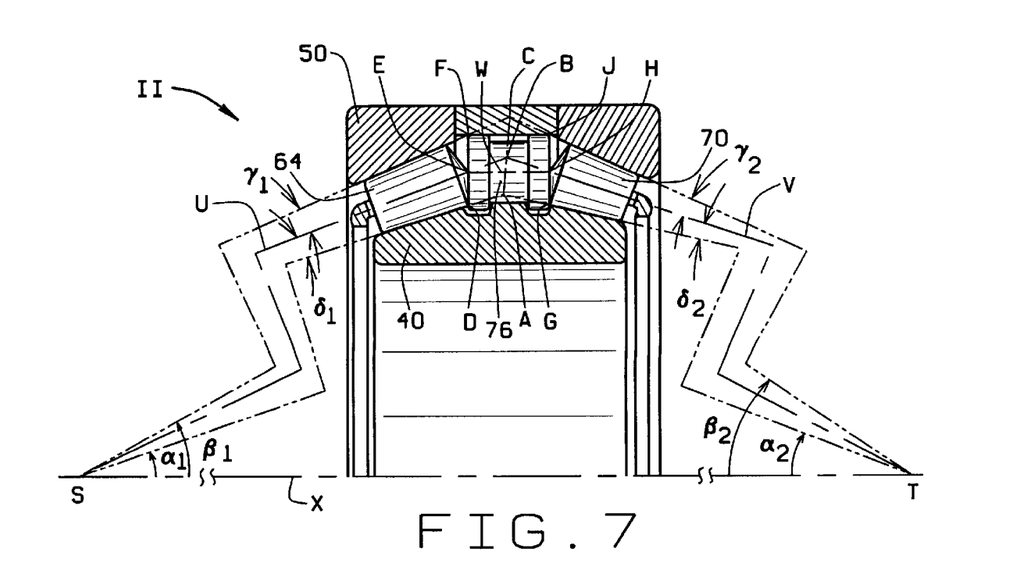
FIG. 7 is a sectional view similar to FIG. 5 but showing reference lines and points and angles.

Each tapered roller 64, as it rolls along the raceways 42 and 54 between which it is confined, rotates about its own axis U which intersects the axis X of the bearing II at point S (FIG. 7). The envelopes occupied by the raceways 42 and 54 also intersect the axis X at point S and lie at angles $\alpha_1$ and $\beta_1$, respectively, with respect to the axis X. The axis U extends through the apex of the conical end face 68. The axis U bisects the raceways 42 and 54, so the included angle $\gamma_1$ between the envelope of the raceway 54 and the axis U equals the included angle $\delta_1$ between the envelope for the raceway 42 and axis U. Likewise, each tapered roller 70 as it rolls along its raceways 44 and 58 revolves about its axis V which intersects the axis X at point T. The envelopes occupied by the raceways 44 and 58 also intersect the axis X at point T at angles $\alpha_1$ and $\beta_2$. The apex of the conical end face 74 lies along the axis V. Moreover, the axis V. bisects the raceways 58 and 44 so the included angle $\gamma_2$ between the raceway 58 and the axis V equals the included angle $\delta_2$ between the envelope for the raceway 44 and the axis V.

Each intervening roller 76 as it rolls along its cylindrical raceways 46 and 62 revolves about an axis W that lies parallel to the bearing axis X and coincides with the centerline of the roller 76 (FIG. 7). The axis W intersects the axis U of the aligned tapered roller 64 at point E and the axis V of the aligned tapered roller 70 at point H.

The envelope occupied by the cylindrical intervening raceway 46 on the cone 40 intersects the envelope for the tapered raceway 42 of the cone 40 at point D and the envelope for the other tapered raceway 44 for the cone 40 at point G (FIG. 7). The envelope for the outer cylindrical raceway 62 on the spacer 60 of the cup 50 intersects the outer tapered raceway 54 at point F and the outer tapered raceway 58 at point J. A straight line passing through the points D and F contains the point E where the axes U and W intersect, so the line of contact between the conical end face 68 of the tapered roller 64 and the facing planar end face 82 of the intervening roller 76 lies along the line D F. A straight line passing through points D and J contains the point H at which the axes V and W intersect, so the line contact between the conical end face 74 of the tapered roller 70 and the facing planar end face 82 of the intervening roller 76 lies along the line G J.

Within the bearing II the following mathematical relations exists:

$$\frac{\sin\alpha_1}{\sin\beta_1} \cdot \frac{\sin\gamma_1}{\sin\delta_1} = \frac{\sin\alpha_2}{\sin\beta_2} \cdot \frac{\sin\gamma_2}{\sin\delta_2} \text{ or } \frac{\sin\alpha_1}{\sin\beta_1} = \frac{\sin\alpha_2}{\sin\beta_2}$$

since $\gamma_1$ equals $\delta_1$ and $\gamma_2$ equals $\delta_2$

Pure rolling contact exists between:
1. the side faces 66 of the tapered rollers 64 and the tapered raceways 42 and 54;
2. the side faces 72 of the tapered rollers 70 and the tapered raceways 44 and 58;
3. the small side surface 78 of the intervening roller 76 and the cylindrical intervening raceway 46 of the cone 40;
4. the large side surface 80 of the intervening roller 76 and the cylindrical raceway 62 on the spacer 60 of the cup 50;
5. the conical end face 68 on the roller 64 and the facing planar end face 82 on the intervening roller 76;
6. the conical end face 74 on the roller 70 and the facing planar end face 82 on the intervening roller 76.

The bearing II operates in a condition of preload, and as a consequence no clearances exist between the tapered rollers 64 and the raceways 42 and 54 or between the tapered rollers 70 and the raceways 44 and 58 or between the planar end faces 82 of the intervening rollers 76 and the conical end faces 68 and 74 of the tapered rollers 64 and 70. Also, no clearances exist between the side faces 78 and 80 of the intervening rollers 76 and the raceways 46 and 62.

The two side surfaces 78 and 80 of differing diameter on each intervening roller 76 enable the intervening rollers 76 to operate in a pure rolling condition between the two raceway 46 and 62 and thereby carry radial loads, all while maintaining the bearing II quite compact. Also, the grooves 48 in the cone 40 and the annular space between the small side surfaces 78 of the intervening rollers 76 and the cylindrical raceway 62 facilitate the circulation of lubricant in the bearing, and the bearing II operates at lower temperatures. Moreover, the pure rolling contact nature of the rollers 76, made possible by their reliefs, enables the bearing II to operate at higher speeds. Another modified bearing III (FIG. 8) also has its rollers organized in three rows between inner and outer races. The inner race constitutes a unitary cone 90 having tapered raceways 92 and 94 and a cylindrical raceway 96 extended between the large ends of the tapered raceways 92 and 94. The outer race constitutes a segmented cup 100 including a single cup 102 having a tapered raceway 104 presented toward the raceway 92 of the cone 90 and another single cup 106 having a tapered raceway 108 presented toward the other tapered raceway 94 of the cone 90. In addition, the segmented cup 100 has a spacer 110 located between the two single cups 102 and 106, and it has a cylindrical raceway 112 that is presented inwardly toward the cylindrical raceway 96 of the cone 90. The raceway 112 on the spacer 110 exists in two segments which are separated by a groove 114. The two single cups 102 and 106 and the spacer 110 are all clamped firmly together or otherwise secured so that they will not separate.

Figures 8, 9:
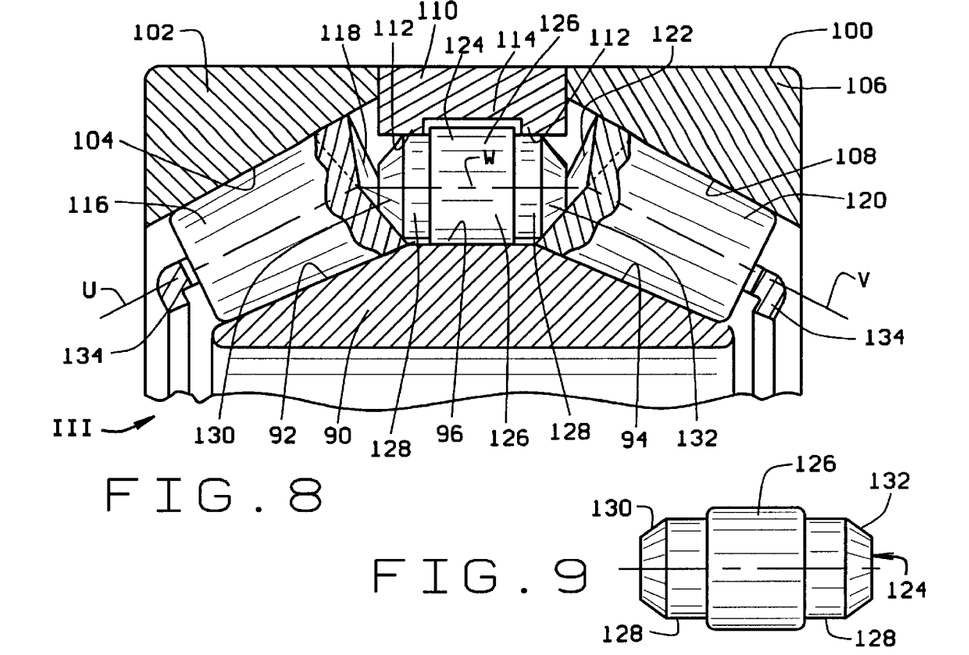
FIG. 8 is a sectional view of another modified tapered roller bearing with two rows of tapered rollers and an intervening row of cylindrical rollers and in which pure rolling contact exists at all critical surfaces.
FIG. 9 is an elevational view of an intervening roller for the bearing of FIG. 8.

The space between the tapered raceways 92 and 104 is occupied by a row of tapered rollers 116 which contact the raceways 92 and 104, there being essentially line contact between the side surfaces of the rollers 116 and the raceways 92 and 104. The rollers 116 at their large ends have conical end faces 118 which are concave.

Likewise, the space between the tapered raceways 94 and 108 is occupied by another row of tapered rollers 120. Each roller 120 along its side surface contacts the raceways 94 and 108, establishing essentially line contact. Each roller 120 at its large end has a conical end face 122 that is concave. The rollers 120 may differ in configuration from the rollers 116.

The annular space between the two cylindrical raceways 96 and 112 is occupied by a row of intermediate rollers 124 (FIGS. 8 and 9). Each roller 124 has a large side surface 126 and a small side surface 128, with the latter being segmented in that it lies beyond each end of the former. The large side surface 126 contacts the cylindrical raceway 96 on the cone 90, there being line contact here. It further projects into the groove 114 in the spacer 110, but clearances exist between the surface 126 and the bottom of the groove 114 as well as between the shoulders at the ends of the surface 126 and the sides of the groove 114. The roller 124 contacts the cup 100 only along its small side surface 128. Here again, line contact exists between the side surface 128 and the raceway 112 along which it rolls. The two side surfaces 126 and 128 of the roller 124 are coaxial about a common center axis.

In addition to the side surfaces 126 and 128, each intervening roller 124 has beveled end surfaces 130 and 132. The end surface 130 contacts the conical end surfaces 118 on the tapered rollers 116, while the end surfaces 132 contact the conical end surfaces 122 of the tapered rollers 120. Again, the rollers 116, 120 and 124 are organized into sets. For each intervening roller 124, a single tapered roller 116 aligns with that intervening roller 124 beyond its one end and a single tapered roller 120 aligns with the same intervening roller 124 at its opposite end. Indeed, the beveled end face 130 projects into the concave end 118 of the roller 116 and contacts that conical end face 118, there being line contact between the beveled face 130 and the conical end face 118. Likewise, the beveled end face 132 projects into the concave end face 122 of the roller 120 and contacts that conical end face 122, there being line contact between the faces 122 and 132.

Finally, the bearing III has a cage 134 provided with pockets in which the rollers 116, 120 and 124 are captured. The cage 134 insures that the rollers 116, 120 and 124 remain organized in sets.

Figure 10:
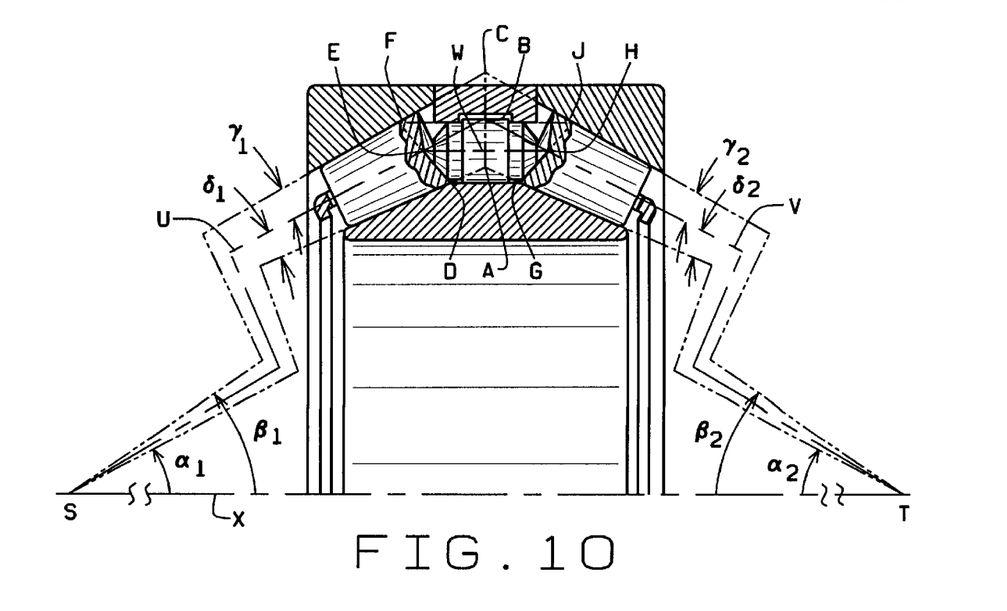
FIG. 10 is a sectional view similar to FIG. 8 but showing reference lines and points and angles.

The envelopes for the raceways 92 and 104 converge at a point S that lies along the axis X (FIG. 10). Each roller 116 rotates about an axis U which intersects the axis X at point S. The axis U bisects the raceways 92 and 104 so the included angle $\gamma_1$ between the envelope for the raceway 104 and the axis U equals the included angle $\delta_1$ between the envelope for the raceway 92 and the axis U. The envelopes for the raceways 94 and 108 converge to a point T where they intersect, and the point T also lies along the axis X. Each roller 120 rotates about an axis V which intersects the axis X at point T. The axis V bisects the raceways 94 and 108 so the included angle $\gamma_2$ between the raceway 108 and the axis V equals the included angle $\delta_2$ between the raceway 94 and the axis V.

The envelopes for the cylindrical raceways 96 and 112 lie parallel to the axis X and each intervening roller 124 revolves between the raceways 96 and 112 about an axis W which of course is also parallel to the axis X and coincides with the centerline for the roller 124. The envelope for the cylindrical raceway 96 intersects the envelope for the tapered raceway 92 at point D and the envelope for the tapered raceway 94 at point G. The envelope for the cylindrical raceway 112 intersects the envelope for the outer tapered raceway 104 at point F and the envelope for the outer tapered raceway 108 at point J. The apex E of the conical end face 118 for the tapered roller 116 lies along a straight line connecting the points D and F. On the aligned intervening roller 124, the beveled end face 130 contacts the conical end face 118 of the tapered roller 116 along line DF. Likewise, the apex H for the conical end face 122 of the other tapered roller 120 that aligns with the intervening roller 124 lies along a straight line connecting the points G and J. Along this line the other beveled end face 132 of the intervening roller 124 contacts the conical end face 122. The axis W of rotation for the intervening roller 124 passes through the points E and H. The point E lies along the axis U of rotation for the tapered roller 116, while the point H lies along the axis V of rotation for the tapered roller 120.

Within the bearing III, the following mathematical relationship exists:

$$\frac{\sin\alpha_1}{\sin\beta_1} \cdot \frac{\sin\gamma_1}{\sin\delta_1} = \frac{\sin\alpha_2}{\sin\beta_2} \cdot \frac{\sin\gamma_2}{\sin\delta_2} \text{ or } \frac{\sin\alpha_1}{\sin\beta_1} = \frac{\sin\alpha_2}{\sin\beta_2}$$

since $\gamma_1$ equals $\delta_1$ and $\gamma_2$ equals $\delta_2$

Pure rolling contact exists between:
1. the side faces of the tapered rollers 116 and the tapered raceways 92 and 104;
2. the side faces of the tapered rollers 120 and the tapered raceways 94 and 108;
3. the large side surface 126 of the intervening roller 124 and the cylindrical intervening raceway 96 of the cone 90;
4. the small side surface 128 of the intervening roller 124 and the cylindrical raceway 112 on the spacer 110 of the cup 100;
5. the conical end face 118 on the roller 116 and the beveled end face 130 on the intervening roller 124; and
6. the conical end face 122 on the tapered roller 120 and the beveled end face 132 on the intervening roller 124.

The bearing III operates in a condition of preload, and as a consequence no clearances exist between the tapered rollers 116 and the raceways 92 and 104, or between the tapered rollers 120 and the raceways 94 and 108 or between the beveled end faces 130 and 132 on intervening rollers 124 and the conical end faces 118 and 122 on the aligned tapered rollers 116 and 120. Also no clearances exist between the side faces 126 and 128 of the intervening rollers 124 and the raceways 96 and 112.

The large side surface 126 on the intervening roller 124 does not extend the entire length of the cylindrical raceway 96 on the cup 90, and as a consequence small voids exist between the two segment of the axially directed small side surface 128 and the cylindrical raceway 96. The lubricant for the bearing III flows through these voids and thus circulates better than if they did not exist. The same holds true at the groove 114 that separates the two segments of the cylindrical raceway 112 on the spacer 110. Moreover, the groove 114 renders the spacer 110 suitable for reception of a speed sensor capable of monitoring the intervening rollers 124, producing a pulse each time one passes. The frequency of the pulses, of course, reflects the angular velocity of the cone 90 when it rotates within the segmented cup 100.

Furthermore, the two sides surfaces 126 and 128 on each intervening roller 124 enables the intervening rollers 124 to operate in a pure rolling condition between two raceways, that is the raceways 96 and 112, and thus carry radial loads, all while maintaining the bearing III quite compact. Also, the configurations of the end faces 130 and 132 for the intervening rollers 124 and the end faces 118 and 122 for the tapered rollers 116 and 120 facilitates synchronization, so the rollers 116, 120 and 124 of any set track well.

While the invention has been discussed in the context of antifriction bearings, the principles of the invention have utility in other devices for accommodating rotation about an axis as well. For example, the principles of pure rolling contact employed in connection with bearings may be used in other devices for accommodating rotation about an axis, such as traction drive transmissions or speed reducers, all to reduce unwanted friction.

What is claimed is:

1. A device for accommodating rotation about an axis X, said device comprising: an inner race having first and second tapered raceways presented outwardly away from the axis X, with the first raceway of the inner race being at an angle $\alpha_1$ with respect to the axis X and the second raceway of the inner race being at an angle $\alpha_2$ with respect to the axis X; an outer race having first and second tapered raceways presented inwardly toward the axis X, with the first raceway of the outer race being located opposite the first raceway of the inner race and at an angle $\beta_1$ with respect to the axis X and the second raceway of the outer race being located opposite the second raceway of the inner race and at an angle $\beta_2$ with respect to the axis X, the envelopes formed by first raceways intersecting the axis X generally at a first point and the envelopes formed by the second raceways intersecting the axis X generally at a second point, the envelopes formed by the raceways of the inner race intersecting each other at a point A that is generally between the first and second points and the envelopes formed by the raceways of the outer race also intersecting each other at a point C that is generally between the first and second points; first rollers located between the first raceways and having side and end surfaces, with the side surfaces being in essentially line contact with the first raceways and there being pure rolling contact between the side surfaces of the first rollers and the first raceways, each first roller having an axis U, there being an included angle $\gamma_1$ between the axis U and the envelope for first raceway of the outer race and an included angle $\delta_1$ between the axis U and the envelope for the first raceway for the inner race; and second rollers located between the second raceways, each second roller having large and small side surfaces, with the large side surface being essentially in line contact with one of the second raceways, and the small side surface being essentially in line contact with the other second raceway, there being pure rolling contact being the side surfaces of the second rollers and the second raceways that they contact, each second roller having an axis V, there being an included angle $\gamma_2$ between the axis V and the envelope for the second raceway of the outer race and an included angle $\delta_2$ between the axis V and the envelope for the second raceway of the inner race, each second roller also having an end face located beyond the large ends of the side faces, there being for each first roller a second roller generally aligned with it, whereby the first and second rollers are organized in sets, the first and second rollers in any set being in contact with each other along their end surfaces, so that the second roller prevents axial displacement of the first roller and vice versa, there being pure rolling contact between the end faces of the first and second rollers.

2. A device according to claim 1 wherein the large side surface of each second roller contacts the second raceway of the inner race and the small side surface of the second roller contacts the second raceway of the outer race.

3. A device according to claim 1 wherein the small side surface of each second roller is segmented, with one segment of it being beyond the large end of the large side surface and another segment of it being beyond small end of the large side surface.

4. A device according to claim 3 wherein the outer race contains a groove that opens out of the second raceway of the outer race toward the second raceway of the inner race, and the groove receives large side surfaces of the second rollers.

5. A device according to claim 1 wherein the end surface on each second roller is oblique to the axis V.

6. A device according to claim 1 wherein the axes U and V of the first and second rollers for a set intersect each other at a point B that lies along a straight line connecting the points A and C, and within the set the beveled end surface of the second roller contacts the end surface of the first roller along the line A C.

7. A device according to claim 1 wherein the relationship between the angles $\alpha_1, \alpha_2, \beta_1, \beta_2, \gamma_1, \gamma_2, \delta_1, \delta_2$ is such that:

$$\frac{\sin\alpha_1}{\sin\beta_1} \cdot \frac{\sin\gamma_1}{\sin\delta_1} = \frac{\sin\alpha_2}{\sin\beta_2} \cdot \frac{\sin\gamma_2}{\sin\delta_2}$$

8. A device for accommodating rotation about an axis, said device comprising: an inner race having first and second tapered raceways and an intervening raceway located between the tapered raceways, all of the raceways of the inner race being presented away from the axis; an outer race having first and second tapered raceways and an intervening raceway located between the tapered raceways, all of the raceways on the outer race being presented inwardly toward the axis, with the first raceway of the outer race surrounding the first raceway of the inner race, the second raceway of the outer race surrounding the second raceway of the inner race, and the intervening raceway of the outer race surrounding the intervening raceway of the inner race; the first and second raceways having their greatest diameters toward the intervening raceways and their least diameters toward the ends of the races; first tapered rollers arranged in a row between the first raceways and having tapered side faces which contact the first raceways, establishing generally line contact with them, and end faces at the large ends of their tapered side faces; second tapered rollers arranged in a row between the second raceways and having tapered side faces which contact the second raceways, establishing generally line contact with them, and end faces at the large ends of their tapered side faces; intervening rollers located between the intervening raceways and having large and small side surfaces and end surfaces located beyond the ends of the side surfaces, the large side surfaces contacting one of the intervening raceways and establishing essentially line contact with it, the small side surfaces contacting the other intervening raceway and establishing essentially line contact with it; the first and second tapered rollers and the intervening rollers being organized into sets, with each set having a first tapered roller, a second tapered roller, and an intervening roller between the first and second tapered rollers and generally aligned with the first and second tapered rollers, within any set, the large end faces of the tapered rollers being in contact with end faces of the intervening roller, there being essentially line contact between the end faces of the tapered rollers and the end faces of the intervening roller.

9. A device according to claim 8 wherein the geometry of the rollers and the raceways is such that pure rolling contact exists between:

1. the first tapered rollers and the first raceways;
2. the second tapered rollers and the second raceways;
3. the large side surfaces of the intervening rollers and the intervening raceway which they contact;
4. the small side surfaces of the intervening rollers and the other intervening raceway;

5. the end face of the first roller in each set and the facing end face of the intermediate rollers in the set;

6. the end face of the second roller in each set and the facing end face of the intermediate roller of the set.

10. A device according to claim 9 wherein the intervening raceways are cylindrical and parallel to the axis, wherein the large side surface of each intervening roller is segmented with a segment being located beyond each end of the small surface; wherein the small side surface of each intervening roller contacts the intervening raceway of the inner race and the segmented large side surface contacts the intervening raceway of the outer race; and wherein the inner race has grooves which open outwardly along the ends of the intervening raceway on that race and accommodate the segments of the large side surfaces on the intervening rollers.

11. A device according to claim 10 wherein the end faces of the first and second tapered rollers are conical and convex.

12. A device according to claim 11 wherein the end faces of the intervening rollers are planar.

13. A device according to claim 9 wherein the intervening raceways are cylindrical and parallel to the axis; wherein the small side surface on each intervening roller is segmented with the segments lying beyond the ends of the large side surface; wherein the large side surface of each intervening roller contacts the intervening raceway of the inner race and the segmented small side surface contacts the intervening raceway of the outer race; and wherein the outer race contains a groove which opens out of the intervening raceway of the outer race toward the intervening raceway of the inner race and receives the large side surfaces of the intervening rollers.

14. A device according to claim 13 wherein end faces of the intervening rollers are beveled and convex.

15. A device according to claim 14 wherein the end faces of the first and second tapered rollers are conical and concave.

16. A device according to claim 8 wherein the envelope of the intervening raceway for the inner race intersects the envelope of the first and second tapered raceways for the inner race at points D and G, respectively; wherein the envelope of the intervening raceway for the outer race intersects the envelopes of the first and second tapered raceways for the outer race at points F and J, respectively; wherein within any set of rollers one end face of the intervening roller contacts the large end face of the first tapered roller along a straight line connecting points D and F and the other end face of the intervening roller contacts the large end face of the second tapered roller along a straight line connecting points G and J.

17. A device according to claim 16 wherein the first rollers have axes of rotation U, the second rollers have axes of rotation V, and the intervening rollers have axes of rotation W; wherein within any set of rollers the axes U and W intersect at a point E that lies along the straight line DF; and wherein within any set of rollers the axes V and W intersect at a point H that lies along the straight line GJ.

18. A device for accommodating rotation about an axis X, said device comprising: an inner race having multiple raceways including first and second tapered raceways presented outwardly away from the axis X, with the first raceway of the inner race being at an angle $\alpha_1$ with respect to the axis X and the second raceway of the inner race being at an angle $\alpha_2$ with respect to the axis X; an outer race having multiple raceways including first and second tapered raceways presented inwardly toward the axis X, with the first raceway of the outer race being located opposite the first raceway of the inner race and at an angle $\beta_1$ with respect to the axis X and the second raceway of the outer race being located opposite the second raceway of the inner race and at an angle $\beta_2$ with respect to the axis X; the envelopes formed by first raceways intersecting the axis X generally at a first point and the envelopes formed by the second raceways intersecting the axis X generally at a second point, the envelopes formed by the first and second raceways of the inner race intersecting each other at a point A that is generally between the first and second points and the envelopes formed by the first and second raceways of the outer race also intersecting each other at a point C that is generally between the first and second points; rollers arranged in rows between the inner and outer races and including first rollers located between the first raceways and having side and end surfaces, with the side surfaces being in essentially line contact with the first raceways, each first roller having an axis U, there being an included angle $\gamma_1$ between the axis U and the envelope for first raceway of the outer race and an included angle $\delta_1$ between the axis U and the first raceway for the inner race; and second rollers located between the second raceways and having side and end surfaces, with the side surfaces being essentially in line contact with the second raceways, each second roller having an axis V, there being an included angle $\gamma_2$ between the axis V and the envelope for the second raceway of the outer race and an included angle $\delta_2$ between the axis V and the envelope for the second raceway of the inner race; the rollers being organized into sets with each set including a first roller and a second roller generally aligned with the first roller, one of the rollers of the set having large and small side surfaces with one of the side surfaces being against a raceway on the inner race and the other side surface being against a raceway on the outer race, the race having the raceway against which the smaller side surface bears being relieved to accommodate the larger side surface, the first roller of a set being in contact with another roller of a set at the end face of the first roller and preventing axial displacement of the set in one axial direction and the second roller of a set being in contact with another roller of a set at the end face of the second roller and preventing axial displacement of the set in the other axial direction, there being pure rolling contact at the side faces of the rollers aid at the end faces of the first and second rollers.

19. A device according to claim 18 wherein the inner race has an intervening raceway between its first and second raceways; wherein the outer race has an intervening raceway between its first and second raceways, with the intervening raceway of the outer race being presented toward the intervening raceway of the inner race; wherein intervening rollers are arranged in a row between the intervening raceways and have side surfaces in line contact with the intervening raceways, each set of rollers including an intervening roller located between the first and second rollers of the set.

20. A device according to claim 19 wherein the intervening rollers having the large and small side surfaces.

21. A bearing according to claim 18 wherein the relationship between the angles $\alpha_1, \alpha_2, \beta_1, \beta_2, \gamma_1, \gamma_2, \delta_1, \delta_2$ is such that:

$$\frac{\sin\alpha_1}{\sin\beta_1} \cdot \frac{\sin\gamma_1}{\sin\delta_1} = \frac{\sin\alpha_2}{\sin\beta_2} \cdot \frac{\sin\gamma_2}{\sin\delta_2}$$

* * * * *